(12) United States Patent
Yasui

(10) Patent No.: US 12,269,468 B2
(45) Date of Patent: Apr. 8, 2025

(54) VEHICLE CONTROL DEVICE AND VEHICLE CONTROL METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 17/704,583

(22) Filed: Mar. 25, 2022

(65) Prior Publication Data
US 2022/0314978 A1 Oct. 6, 2022

(30) Foreign Application Priority Data
Mar. 31, 2021 (JP) .................. 2021-061591

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 30/12;
(Continued)

(56) References Cited

U.S. PATENT DOCUMENTS 6,157,892 A 12/2000 Hada et al.
9,031,743 B2 5/2015 Okita
(Continued)

FOREIGN PATENT DOCUMENTS

CN 101641248 A 2/2010
CN 112277937 A 1/2021
(Continued)

OTHER PUBLICATIONS

Japanese Office Action for Japanese Application No. 2021061591 mailed Aug. 30, 2024.
(Continued)

*Primary Examiner* — Daniel M. Robert
(74) *Attorney, Agent, or Firm* — Thomas | Horstemeyer, LLP

(57) ABSTRACT

A vehicle control device for controlling steering and braking of a vehicle: determines, based on prediction of movement of an object detected on a road and prediction of a traveling trajectory of the vehicle, whether collision between the vehicle and the object will occur; determines whether it is possible to avoid the collision by braking without steering when it is determined that the collision will occur; and performs braking control for avoiding the collision and assists the steering such that the vehicle remains in a lane in which the vehicle is traveling when it is determined that it is possible to avoid the collision by braking.

13 Claims, 11 Drawing Sheets

(51) Int. Cl.
  *B60W 10/20* (2006.01)
  *B60W 30/095* (2012.01)
  *B60W 30/12* (2020.01)
  *B60W 40/04* (2006.01)
  *B60W 50/14* (2020.01)
  *B60W 50/16* (2020.01)

(52) U.S. Cl.
  CPC ........ *B60W 30/0956* (2013.01); *B60W 30/12* (2013.01); *B60W 40/04* (2013.01); *B60W 50/16* (2013.01); *B60W 2050/143* (2013.01); *B60W 2050/146* (2013.01); *B60W 2510/202* (2013.01); *B60W 2554/4045* (2020.02)

(58) Field of Classification Search
  CPC ................. B60W 40/04; B60W 50/16; B60W 2050/143; B60W 2050/146; B60W 2510/202; B60W 2554/4045; B60W 30/0953; B60W 50/14; B60W 40/10; B60W 2520/10; B60W 2540/18; B60W 2554/20; B60W 2554/4023; B60W 2554/4029; B60W 2554/80
  See application file for complete search history.

(56) References Cited

U.S. PATENT DOCUMENTS

| | | |
|---|---|---|
| 11,577,720 B2 | 2/2023 | Miyamoto et al. |
| 11,738,749 B2 * | 8/2023 | Sachdev ............... B60W 30/12 701/26 |
| 11,926,316 B2 | 3/2024 | Miyamoto et al. |
| 2010/0030426 A1 | 2/2010 | Okita |
| 2017/0057498 A1 * | 3/2017 | Katoh ............... B60W 30/0956 |
| 2018/0060467 A1 * | 3/2018 | Schulte ............. B60W 30/0956 |
| 2018/0257644 A1 * | 9/2018 | Morotomi ........... G05D 1/0246 |
| 2018/0286242 A1 * | 10/2018 | Talamonti ............. B60W 30/14 |
| 2019/0073540 A1 * | 3/2019 | Yamada .................... G01S 7/24 |
| 2021/0024059 A1 | 1/2021 | Miyamoto et al. |
| 2022/0281473 A1 * | 9/2022 | LaBarbera ........... B62D 15/025 |
| 2022/0314978 A1 * | 10/2022 | Yasui ................ B60W 30/0953 |
| 2023/0150488 A1 | 5/2023 | Miyamoto et al. |
| 2023/0339463 A1 * | 10/2023 | Fuess .................... B60W 30/12 |

FOREIGN PATENT DOCUMENTS

| | | | | |
|---|---|---|---|---|
| DE | 102009020649 A1 * | 11/2010 | .......... | B60T 8/17558 |
| DE | 102011115138 A1 * | 3/2013 | ........... | B60W 30/10 |
| JP | H11-348799 A | 12/1999 | | |
| JP | 2018-095122 A | 6/2018 | | |
| JP | 2018-177148 A | 11/2018 | | |

OTHER PUBLICATIONS

Chinese Office Action for Chinese Application No. 202210305509.1 mailed Nov. 29, 2024.

* cited by examiner

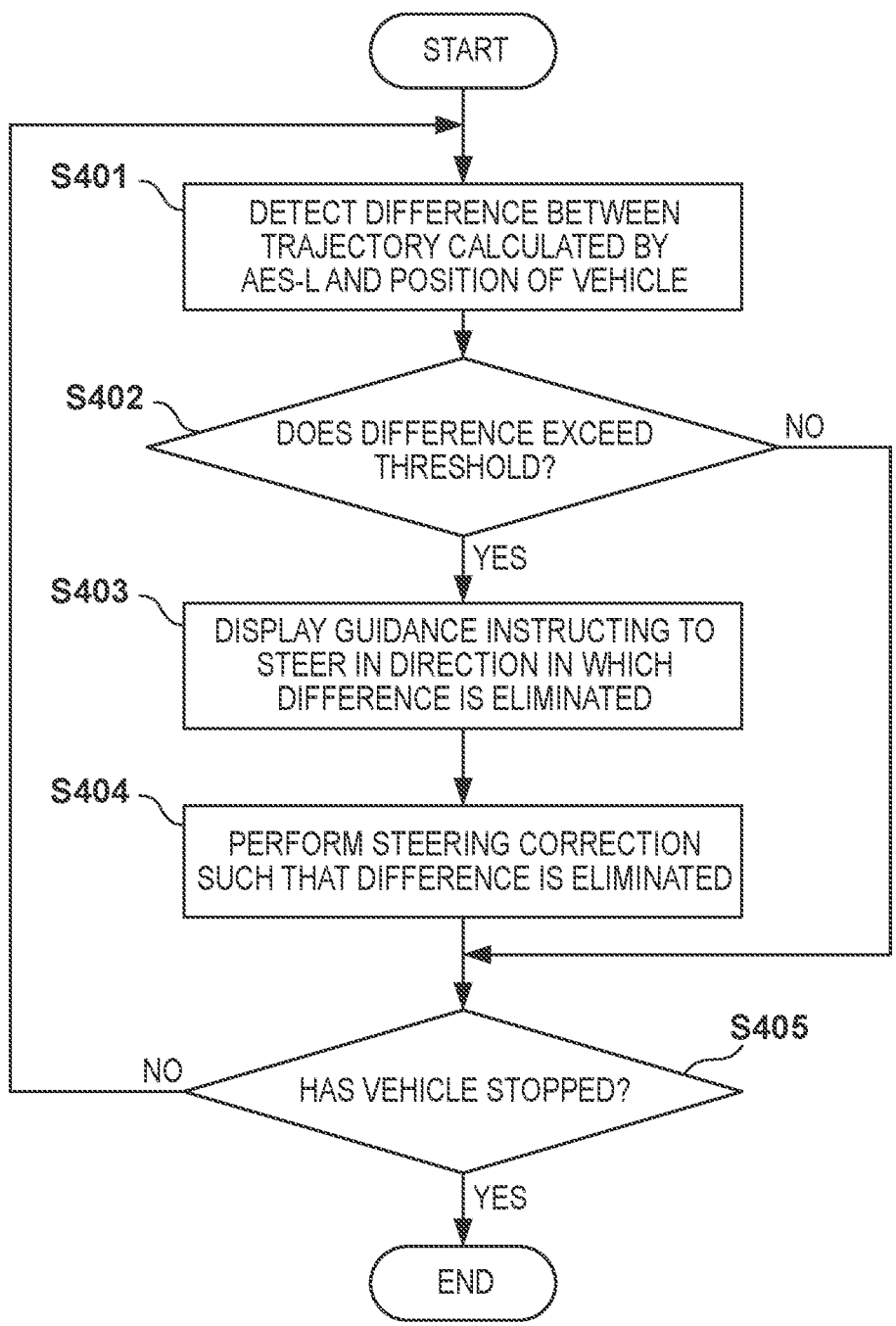

VEHICLE CONTROL DEVICE AND VEHICLE CONTROL METHOD, AND STORAGE MEDIUM

CROSS-REFERENCE TO RELATED APPLICATION(S)

This application claims priority to and the benefit of Japanese Patent Application No. 2021-061591 filed on Mar. 31, 2021, the entire disclosure of which is incorporated herein by reference.

BACKGROUND OF THE INVENTION

Field of the Invention

The present invention relates to a vehicle control technology.

Description of the Related Art

In general, a collision mitigation brake system (CMBS) is known as a driving assistance technique for avoiding collision with an object appearing on a traveling road while a vehicle is traveling. With the CMBS, the brake of the vehicle is controlled based on the position and distance of the object recognized by a camera, and the vehicle is stopped before coming into contact with the object. In addition, a technique called automatic emergency steering (AES) for performing steering assistance for avoiding a collision between a vehicle and an object appearing on a traveling road is known.

Japanese Patent Laid-Open No. 2018-095122 describes a technique of avoiding collision by a brake operation when the distance between a vehicle and an object to be avoided is equal to or greater than a stoppable distance and avoiding collision by steering when the distance between the vehicle and the object to be avoided is shorter than the stoppable distance and is equal to or greater than a steering-avoidable distance.

As described in Japanese Patent Laid-Open No. 2018-095122, in general, collision avoidance is performed only by CMBS-based brake control when the collision can be avoided by the CMBS, and AES-based steering assistance is performed when it is determined that the collision cannot be avoided only by the CMBS. No assistance is provided for steering during the collision avoidance only by the CMBS-based brake control. However, even while the vehicle control system determines that collision can be avoided by the CMBS and performs brake control, the user may reflexively operate the steering wheel. Such unnecessary steering wheel operation may cause departure to the opposite lane, for example.

SUMMARY OF THE INVENTION

According to an aspect of the present invention, there is provided a technique for performing appropriate steering assistance in avoiding collision only by braking control.

According to one aspect of the present invention there is provided a vehicle control device for controlling steering and braking of a vehicle, the vehicle control device comprising: a first determination unit configured to determine, based on prediction of movement of an object detected on a road and prediction of a traveling trajectory of the vehicle, whether collision between the vehicle and the object will occur; a second determination unit configured to determine whether it is possible to avoid the collision by braking without steering when it is determined by the first determination unit that the collision will occur; and an assistance unit configured to perform braking control for avoiding the collision and assist the steering such that the vehicle remains in a lane in which the vehicle is traveling when it is determined by the second determination unit that it is possible to avoid the collision by braking.

According to another aspect of the present invention there is provided a vehicle control method for controlling steering and braking of a vehicle, the method comprising: determining, based on prediction of movement of an object detected on a road and prediction of a traveling trajectory of the vehicle, whether collision between the vehicle and the object will occur; determining whether it is possible to avoid the collision by braking without steering when it is determined that the collision will occur; and performing braking control for avoiding the collision and assisting the steering such that the vehicle remains in a lane in which the vehicle is traveling when it is determined that it is possible to avoid the collision by braking.

According to another aspect of the present invention there is provided a non-transitory computer-readable storage medium having stored thereon a program that causes a computer to execute a vehicle control method for controlling steering and braking of a vehicle, the method comprising: determining, based on prediction of movement of an object detected on a road and prediction of a traveling trajectory of the vehicle, whether collision between the vehicle and the object will occur; determining whether it is possible to avoid the collision by braking without steering when it is determined that the collision will occur; and performing braking control for avoiding the collision and assisting the steering such that the vehicle remains in a lane in which the vehicle is traveling when it is determined that it is possible to avoid the collision by braking.

Further features of the present invention will become apparent from the following description of exemplary embodiments with reference to the attached drawings.

BRIEF DESCRIPTION OF THE DRAWINGS

FIG. 4 is a flowchart illustrating control for a collision avoidance operation and steering assistance by in-lane emergency steering;

DESCRIPTION OF THE EMBODIMENTS

Figure 1:
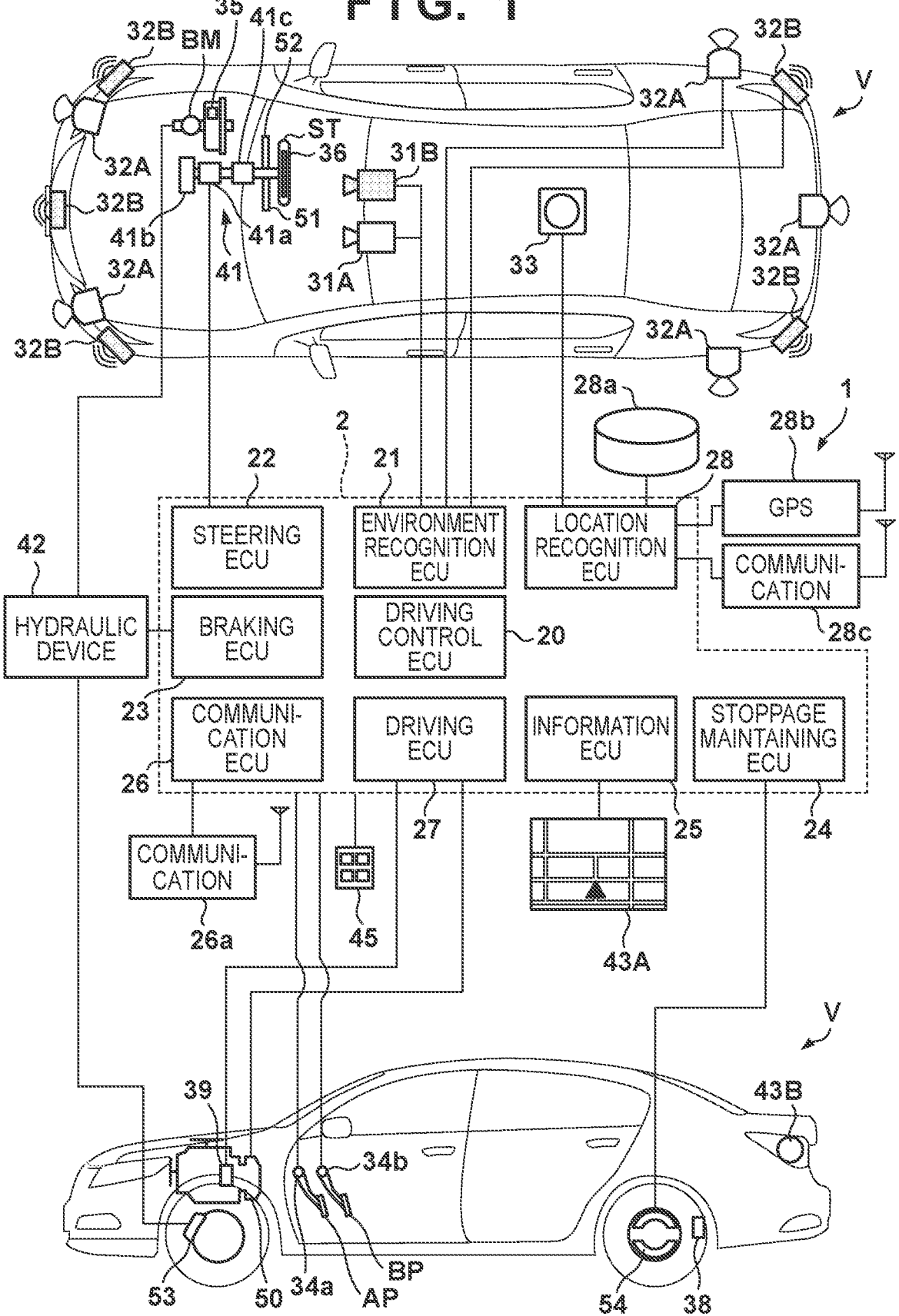
FIG. 1 is a block diagram of a vehicle and a control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle V and a control device 1 thereof according to an embodiment of the present invention. The control device 1 performs various kinds of vehicle control in the vehicle V as a vehicle control device. In FIG. 1, the vehicle V is schematically illustrated in a plan view and a side view. The vehicle V is, for example, a four-wheeled passenger vehicle of a sedan type.

The vehicle V in the present embodiment is, for example, a parallel hybrid vehicle. In this case, a power plant 50, which is a travel driving unit that outputs driving force for rotating the driving wheels of the vehicle V, can include an internal combustion engine, a motor, and an automatic transmission. The motor can be used as a drive source for accelerating the vehicle V, and can also be used as a generator at the time of deceleration or the like (regenerative braking).

<Control Device>

A configuration of the control device 1, which is on board of the vehicle V, will be described with reference to FIG. 1. The control device 1 includes an ECU group (control unit group) 2. The ECU group 2 includes a plurality of ECUs 20 to 28 configured to be capable of communicating with one another. Each ECU includes a processor typified by a CPU, a storage device such as a semiconductor memory, an interface with an external device, and the like. The storage device stores programs executed by the processor, data used for processing by the processor, and the like. Each ECU may include a plurality of processors, storage devices, interfaces, and the like. Note that the number of ECUs and the functions assigned to the ECUs can be designed as appropriate and can be subdivided or integrated as compared with the present embodiment. Note that, in FIG. 1, names of representative functions of the ECUs 20 to 28 are given. For example, the ECU 20 is expressed as "driving control ECU". In addition, each of the ECUs 20 to 28 may have one or more processors and execute a predetermined program to implement various operations, or may implement various operations by dedicated hardware.

The ECU 20 conducts control related to driving assistance including automated driving of the vehicle V. In the automated driving, driving (such as acceleration of the vehicle V by the power plant 50), steering, and braking of the vehicle V are automatically performed without necessitating driver's operations. In addition, in manual driving, the ECU 20 is capable of performing traveling assistance control such as collision mitigation braking and lane deviation suppression, for example. The collision mitigation braking instructs activation of a brake device 53 to assist collision avoidance when the possibility of collision with an obstacle present ahead increases. The lane deviation suppression instructs activation of an electric power steering device 41 to assist lane deviation avoidance when the possibility that the vehicle V deviates from a lane increases. In addition, the ECU 20 is capable of performing automatic following control for causing the vehicle V to automatically follow a preceding vehicle, in both the automated and manual driving. In the case of the automated driving, all of acceleration, deceleration, and steering of the vehicle V may be performed automatically. In the case of the manual driving, acceleration and deceleration of the vehicle V may be performed automatically.

The ECU 21 is an environment recognition unit that recognizes the traveling environment of the vehicle V based on detection results of detection units 31A, 31B, 32A, and 32B that detect the surrounding conditions of the vehicle V. In the case of the present embodiment, the detection units 31A and 31B are cameras that capture images of a view in front of the vehicle V (may hereinafter be referred to as cameras 31A and 31B) and are attached to the vehicle interior side of the windshield at the front of the roof of the vehicle V. By analyzing an image captured by the camera 31A, it is possible to extract the contour of a target object or extract a lane division line (such as a white line) on the road.

In the present embodiment, the detection unit 32A is a light detection and ranging (LiDAR) (may hereinafter be referred to as a LiDAR 32A) and detects a target object around the vehicle V and measures the distance to the target object. In the present embodiment, five LiDARs 32A are provided, including one at each corner portion of a front part of the vehicle V, one at the center of a rear part of the vehicle V, and one at each lateral side of the rear part of the vehicle V. The detection unit 32B is a millimeter-wave radar (may hereinafter be referred to as a radar 32B) and detects a target object around the vehicle V and measures the distance to the target object. In the present embodiment, five radars 32B are provided, including one at the center of the front part of the vehicle V, one at each corner portion of the front part of the vehicle V, and one at each corner portion of the rear part of the vehicle V.

The ECU 22 is a steering control unit that controls the electric power steering device 41. The electric power steering device 41 includes a mechanism that steers the front wheels in accordance with a driver's driving operation (steering operation) on a steering wheel ST. The electric power steering device 41 includes a drive unit 41a including a motor that exerts driving force (which may be referred to as steering assist torque) for assisting a steering operation or automatically steering the front wheels, a steering angle sensor 41b, a torque sensor 41c that detects steering torque born by the driver (which is referred to as steering born torque to be distinguished from the steering assist torque), and the like. The ECU 22 is also capable of acquiring a detection result of a sensor 36 that detects whether the driver grips the steering wheel ST and can monitor the gripping state of the driver.

Indicator levers 51 and 52 are provided near the steering wheel ST. Corresponding left and right direction indicators (not shown) can be operated by operations of an occupant on the direction indicator levers 51 and 52. In addition, in the present embodiment, the occupant can instruct automatic course change of the vehicle V by operating the direction indicator levers 51 and 52. As the instruction for automatic course change, the occupant can instruct a lane change to the left lane by an operation on the indicator lever 51 and can instruct a lane change to the right lane by an operation on the indicator lever 52, for example. The course change instruction by the occupant may be received during automated driving or during automatic following control.

The ECU 23 is a braking control unit that controls a hydraulic device 42. A driver's braking operation on a brake pedal BP is converted into hydraulic pressure in a brake master cylinder BM and is transmitted to the hydraulic device 42. The hydraulic device 42 is an actuator capable of controlling, based on the hydraulic pressure transmitted from the brake master cylinder BM, the hydraulic pressure of hydraulic oil supplied to a brake device (e.g., a disc brake device) 53 provided to each of the four wheels. The ECU 23 controls the driving of an electromagnetic valve or the like included in the hydraulic device 42. The ECU 23 is also capable of turning on a brake lamp 43B at the time of braking. This configuration enables a following vehicle to give more attention to the vehicle V.

The ECU 23 and the hydraulic device 42 can constitute an electric servo brake. For example, the ECU 23 can control distribution of the braking force by the four brake devices 53 and the braking force by the regenerative braking of the motor included in the power plant 50. The ECU 23 is also capable of achieving an ABS function, traction control, and a posture control function of the vehicle V based on detection results of wheel speed sensors 38 provided to four respective wheels, a yaw rate sensor (not shown), and a pressure sensor 35 that detects the pressure in the brake master cylinder BM.

The ECU 24 is a stoppage maintaining control unit that controls an electric parking brake device (e.g., a drum brake) 54 provided to rear wheels. The electric parking brake device 54 includes a mechanism for locking the rear wheels. The ECU 24 can control the locking and unlocking of the rear wheels by the electric parking brake device 54.

The ECU 25 is an in-vehicle notification control unit that controls an information output device 43A that makes a notification of information to the interior of the vehicle. The information output device 43A includes, for example, a display device provided on a head-up display or an instrument panel, or a sound output device. A vibration device may further be included. The ECU 25 causes the information output device 43A to output, for example, various types of information such as the vehicle speed and the outside air temperature, information for route guidance or the like, and information regarding conditions of the vehicle V.

The ECU 26 includes a communication device 26a for vehicle-to-vehicle communication. The communication device 26a performs wireless communication with other surrounding vehicles to exchange information between the vehicles.

The ECU 27 is a drive control unit that controls the power plant 50. In the present embodiment, one ECU 27 is allocated to the power plant 50, but one ECU may be allocated to each of the internal combustion engine, the motor, and the automatic transmission. For example, the ECU 27 controls the output of the internal combustion engine and the motor and switches the gear ratio of the automatic transmission in response to a driver's driving operation, the vehicle speed, or the like detected by an operation detection sensor 34a provided to an accelerator pedal AP or an operation detection sensor 34b provided to a brake pedal BP. Note that the automatic transmission is provided with a rotation rate sensor 39 that detects the rotation rate of the output shaft of the automatic transmission as a sensor that detects a traveling condition of the vehicle V. The vehicle speed of the vehicle V can be calculated from a detection result of the rotation rate sensor 39.

The ECU 28 is a location recognition unit that recognizes the current location and the course of the vehicle V. The ECU 28 controls a gyroscope sensor 33, a GPS sensor 28b, and a communication device 28c and performs information processing on detection results or communication results. The gyroscope sensor 33 detects rotational movement of the vehicle V. The course of the vehicle V can be determined by a detection result of the gyroscope sensor 33, for example. The GPS sensor 28b detects the current position of the vehicle V. The communication device 28c performs wireless communication with a server that provides map information and traffic information, and acquires these pieces of information. Map information with high accuracy can be stored in a database 28a, and the ECU 28 can identify the position of the vehicle V in a lane with higher accuracy based on this map information, for example.

An input device 45 is arranged inside the vehicle so as to be operable by the driver and receives the input of instructions and information from the driver.

<Collision Avoidance Control>

Figure 2:
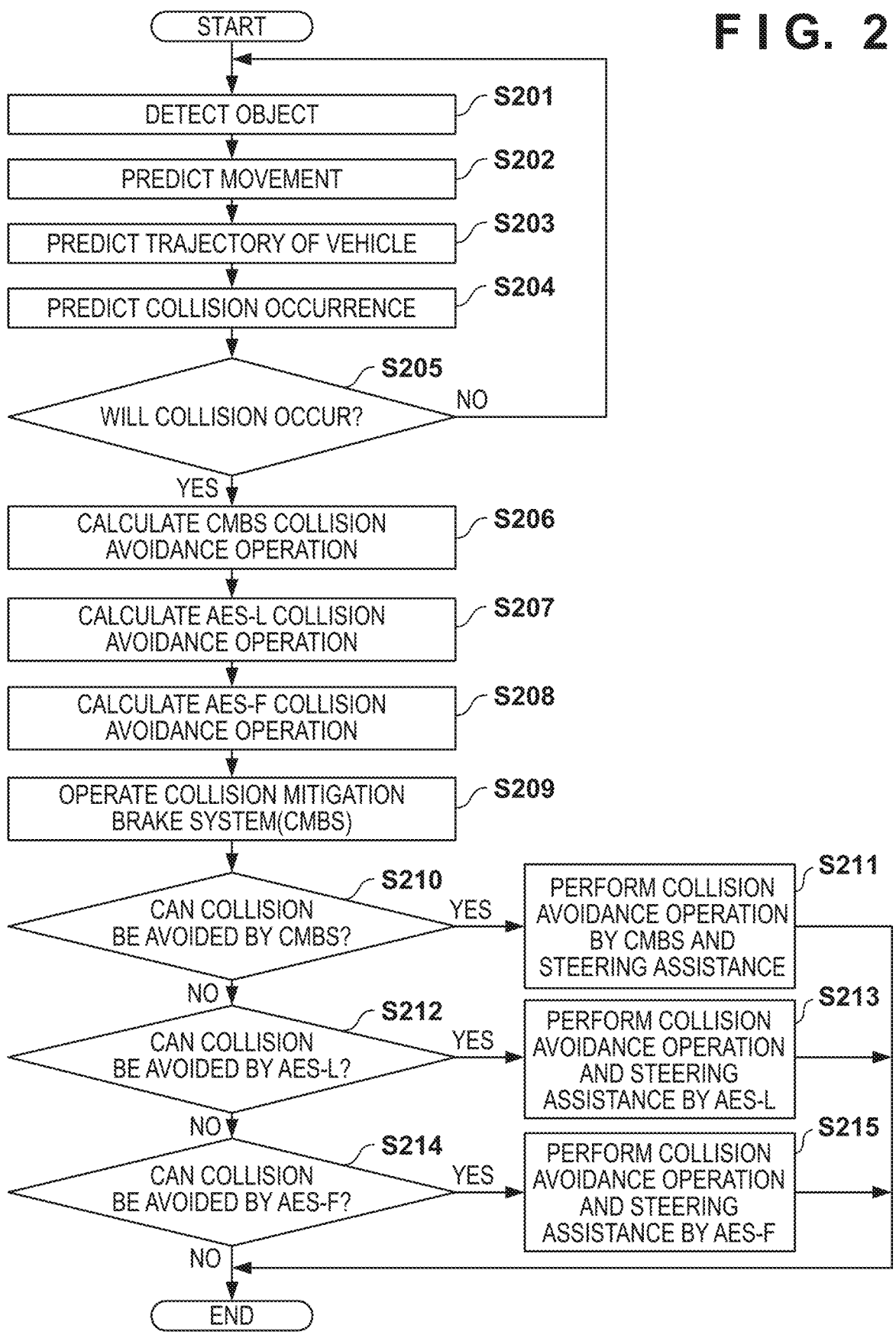
FIG. 2 is a flowchart illustrating collision avoidance control according to the embodiment.

Collision avoidance control by the control device 1 of the vehicle V having the above configuration will be described. FIG. 2 is a flowchart illustrating collision avoidance control according to the present embodiment.

In S201, the ECU 21 detects an object on the road, measures the distance between the vehicle V and the detected object, and provides these pieces of information to the ECU 20. In the present embodiment, examples of the object include another vehicle, a person, and some kind of flying object such as a signboard. In S202, the ECU 20 predicts the movement of the detected object based on the information provided from the ECU 21. In S203, the ECU 20 predicts the trajectory of the vehicle V based on the current angle of the steering wheel of the vehicle V acquired from the ECU 22, the current speed of the vehicle V acquired from the ECU 27, and the like. In S204, the ECU 20 determines whether the vehicle V will collide with (or contact) the object based on the movement of the object predicted in S202 and the trajectory of the vehicle V predicted in S203. For example, the ECU 20 calculates the probability of the occurrence of collision based on the distance between the predicted position of the object and the vehicle and the speed of the vehicle, and determines that collision will occur if the probability exceeds a predetermined value. If it is determined that collision will occur, collision avoidance processing in and after S206 is started. On the other hand, if it is determined that no collision will occur, the processing returns to S201, and the above-described processing is repeated.

In S206, the ECU 20 calculates a collision avoidance operation by the collision mitigation brake system (CMBS). The calculation of the collision avoidance operation includes calculation of brake control for collision avoidance and calculation of a trajectory on which the vehicle V should travel. However, the collision avoidance operation calculated in S206 does not include steering for avoiding collision. Hereinafter, the collision avoidance operation calculated in S206 is referred to as a CMBS-based collision avoidance operation. In the calculation of the CMBS-based collision avoidance operation, the ECU 20 sets a trajectory along the lane in which the vehicle V is traveling as the trajectory on which the vehicle V travels during the collision avoidance operation. The trajectory of the vehicle V predicted in S204 may be used as this trajectory.

Figure 6A:
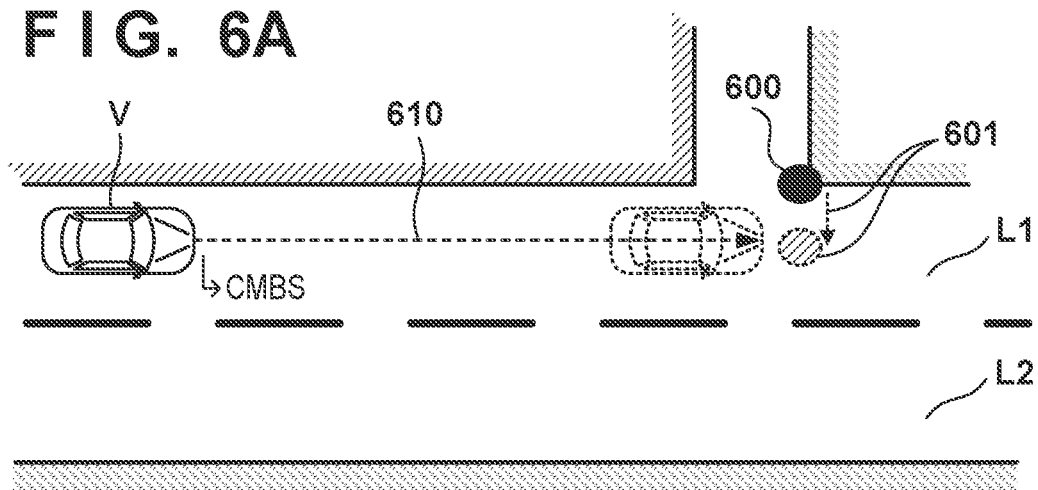
FIGS. 6A to 6C illustrate calculation results of CMBS, AES-L, and AES-F-based collision avoidance operations.

FIG. 6A illustrates an example calculation result of the CMBS-based collision avoidance operation. A trajectory 610 indicates an example of the trajectory set by the calculation of the CMBS-based collision avoidance operation. As described above, the ECU 20 determines whether collision will occur between the vehicle V and an object 600 based on a detected position and predicted movement 601 of the object 600, the speed of the vehicle V, and the trajectory of the vehicle V predicted in S203. If it is determined that collision will occur between the vehicle V and the object 600, the CMBS-based collision avoidance operation is calculated. For example, braking control of applying a braking force of 0.6 to 1.0 G to stop the vehicle V is performed, and a trajectory 610 along a lane L1 on which the vehicle V is traveling is set as the trajectory on which the vehicle V travels during the collision avoidance operation. Note that an anti-lock braking system (ABS) may be used in combination in the braking control.

Figure 6B:
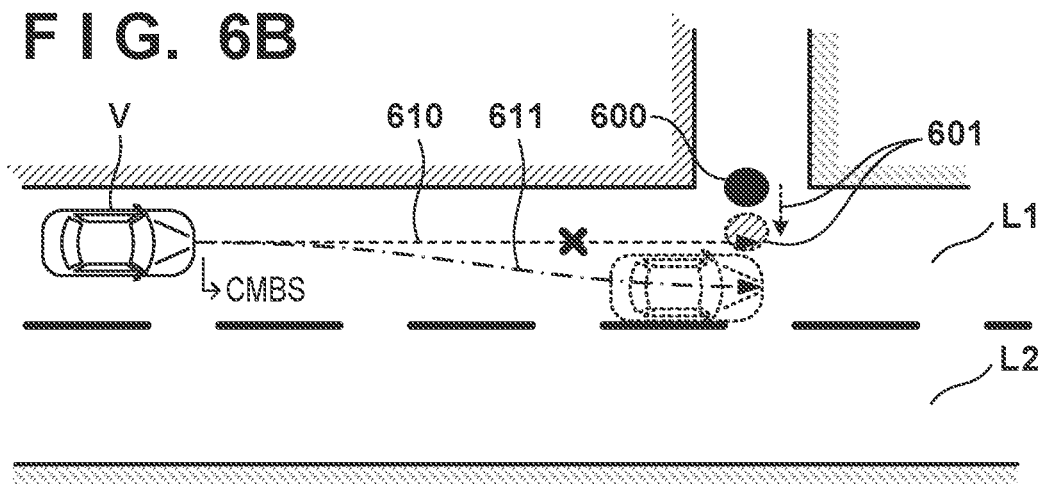

In S207, the ECU 20 calculates collision avoidance operations by the CMBS and automatic emergency steering (AES) that maintains in-lane travel. The operation calculated in S206 can be used for the CMBS-based braking control. Hereinafter, automatic emergency steering that maintains in-lane travel is referred to as AES-L. In FIG. 6B, a trajectory 611 indicates an example calculation result of the AES-L-based collision avoidance operation. When it is determined that collision with the object 600 will occur, the ECU 20 sets a trajectory 611 that does not deviate from the lane L1 on which the vehicle V is traveling as the trajectory on which the vehicle V travels during the collision avoidance operation, in addition to the CMBS-based braking control described above. In FIG. 6B, collision with the object 600 cannot be avoided on the trajectory 610 obtained by the CMBS-based collision avoidance operation (avoidance operation by braking control without avoidance by steering), but collision with the object 600 can be avoided on the trajectory 611 with automatic steering. Note that the trajectory of the collision avoidance operation in the lane may be set on the opposite side of the trajectory 610 from the trajectory 611 as long as it is a trajectory that can avoid collision with the object 600 in the lane.

Figure 6C:
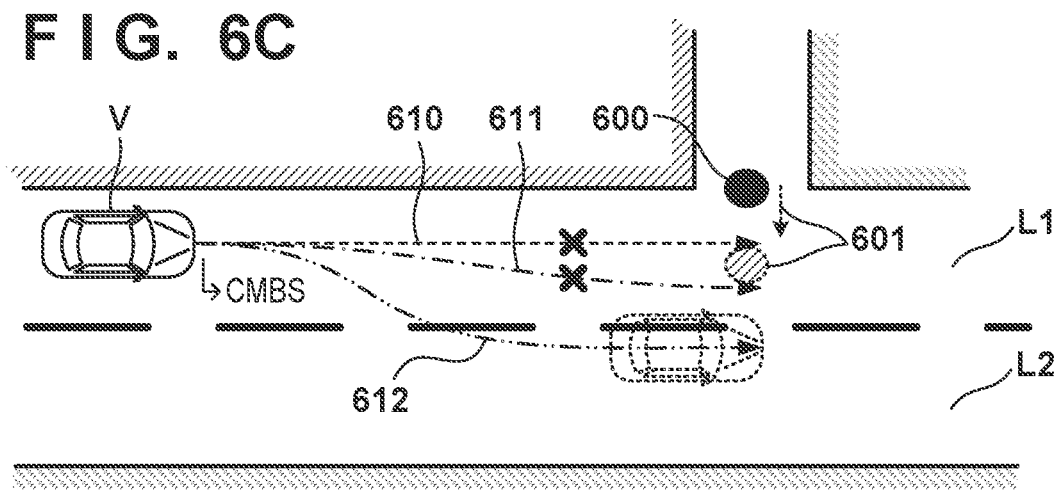

In S208, the ECU 20 calculates a schedule of collision avoidance operations by the CMBS and automatic emergency steering that allows deviation of the vehicle V to the outside of the lane. The operation calculated in S206 can be used for the CMBS-based braking control. Hereinafter, the automatic emergency steering that allows deviation of the vehicle V to the outside of the lane is referred to as AES-F. In FIG. 6C, a trajectory 612 indicates an example of the AES-F-based collision avoidance operation. In the AES-F-based collision avoidance operation, the ECU 20 sets a trajectory by allowing the vehicle V to deviate from the traveling lane L1 and enter an adjacent lane L2. In FIG. 6C, collision between the vehicle V and the object 600 cannot be avoided on the trajectory 611 obtained by the AES-L, but collision with the object 600 is avoided on the trajectory 612 that allows the vehicle V to deviate from the lane L1.

In S209, the ECU 20 issues a control command to the ECU 23 to start CMBS-based braking control. Although the CMBS-based braking control is started in S209 in this example, there is no limitation in this regard since the braking control calculated in S206 is also used by the AES-L and AES-F (common braking control is used). If braking control is independently calculated for the AES-L and AES-F, the braking control calculated for the respective collision avoidance operations according to determination results of S210, S212, and S214 described later may be performed.

In S210, the ECU 20 determines whether collision with the object can be avoided by the CMBS-based collision avoidance operation calculated in S206. That is, it is determined whether collision can be avoided only by braking control without steering. For example, the ECU 20 calculates, based on the position of the object 600 and its distance from the vehicle V and the speed of the vehicle V, the probability of the avoidance of collision between the vehicle V and the object 600 for the case where the vehicle V travels on the predicted trajectory 610 while performing the CMBS-based braking. Then, if the calculated probability of the avoidance of collision exceeds a predetermined value, the ECU 20 determines that collision can be avoided. Note that the probability of the occurrence of collision between the vehicle V and the object 600 may be calculated. In this case, the ECU 20 determines that collision can be avoided if the calculated probability of the occurrence of collision is equal to or less than a predetermined value. If it is determined that collision can be avoided (YES in S210), in S211, the ECU 20 performs steering assistance using the trajectory set in S206 (e.g., the trajectory 610). The steering assistance in this case is not intended to avoid collision with the object to be avoided, but is intended to avoid other hazards that may occur due to unnecessary steering wheel operation. The CMBS-based collision avoidance operation and the steering assistance thereof will be described in detail later with reference to FIG. 3.

If it is not determined in S210 that collision with the object can be avoided by the CMBS-based collision avoidance operation (NO in S210), the processing proceeds to S212. In S212, the ECU 20 determines whether collision with the object can be avoided by the AES-L-based collision avoidance operation calculated in S207. For example, the ECU 20 calculates, based on the position of the object 600 and its distance from the vehicle V and the speed of the vehicle V, the probability of the avoidance of collision between the vehicle V and the object 600 for the case where the vehicle V travels on the predicted trajectory 611 while performing the CMBS-based braking. Then, if the calculated probability of the avoidance of collision exceeds a predetermined value, the ECU 20 determines that collision can be avoided. Note that the probability of the occurrence of collision may be used as described above with regard to S210. If it is determined that collision can be avoided (YES in S212), in S213, the ECU 20 performs steering assistance using the trajectory set in S207 (e.g., the trajectory 611). The AES-L-based collision avoidance operation and the steering assistance thereof will be described in detail later with reference to FIG. 4.

If it is not determined in S212 that collision with the object can be avoided by the AES-L-based collision avoidance operation (NO in S212), the processing proceeds to S214. In S214, the ECU 20 determines whether collision with the object can be avoided by the AES-F-based collision avoidance operation calculated in S208. For example, the ECU 20 calculates, based on the position of the object 600 and its distance from the vehicle V and the speed of the vehicle V, the probability of the avoidance of collision between the vehicle V and the object 600 for the case where the vehicle V travels on the predicted trajectory 612 while performing the CMBS-based braking. Then, if the calculated probability of the avoidance of collision exceeds a predetermined value, the ECU 20 determines that collision can be avoided. Note that the probability of the occurrence of collision may be used as described above with regard to S210. Note that the determination here as to whether collision can be avoided may include determination of the absence of other hazards that may occur due to deviation from the lane, such as the absence of another object (e.g., an oncoming vehicle) in the lane that the vehicle enters. If it is determined in S214 that collision can be avoided, the processing proceeds to S215. In S215, the ECU 20 performs steering assistance using the trajectory set in S207 (e.g., the trajectory 612). Details thereof will be described later with reference to FIGS. 5A and 5B.

If it is not determined in S214 that collision with the object can be avoided by the AES-F-based collision avoidance operation, the processing ends. In this case, collision avoidance or collision mitigation is performed by the CMBS-based braking control started in S209, and no steering assistance is performed.

<CMBS-Based Collision Avoidance Operation>

Figure 3:
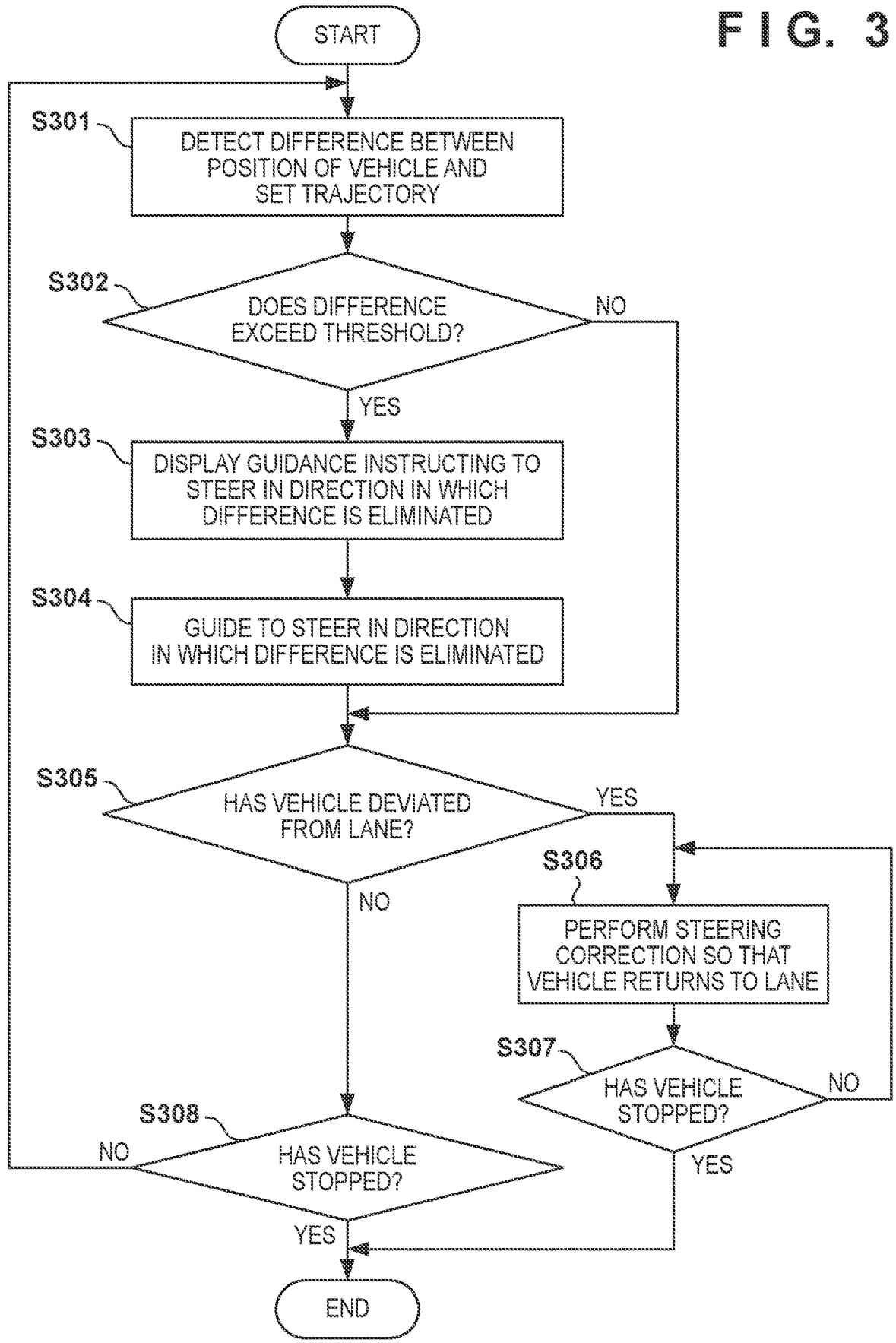
FIG. 3 is a flowchart illustrating control for a CMBS-based collision avoidance operation and steering assistance.
Figure 7A:
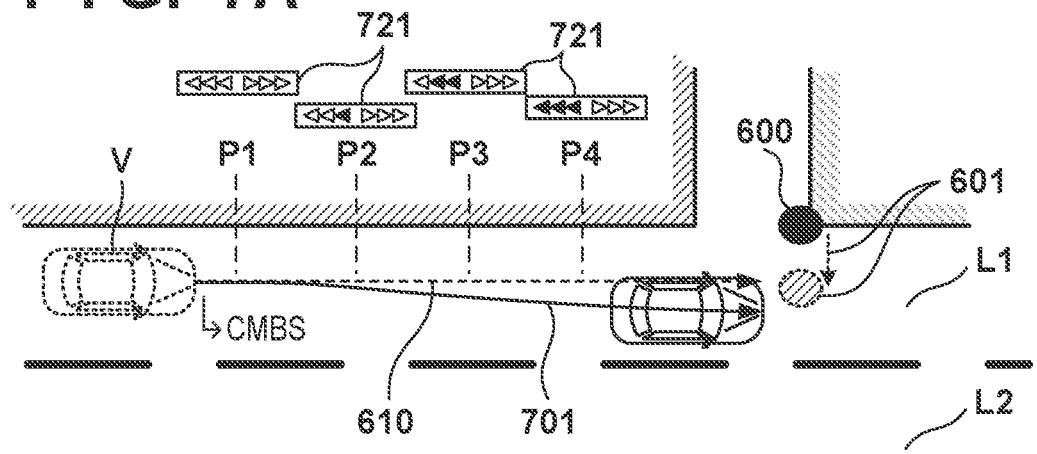
FIGS. 7A to 7C illustrate control examples of the CMBS-based collision avoidance operation and steering assistance.
Figure 7B:
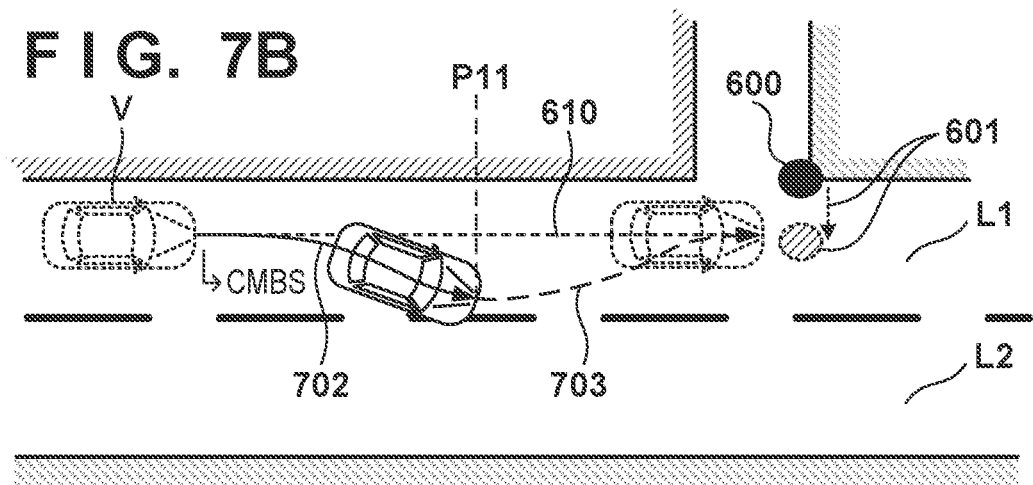
Figure 7C:
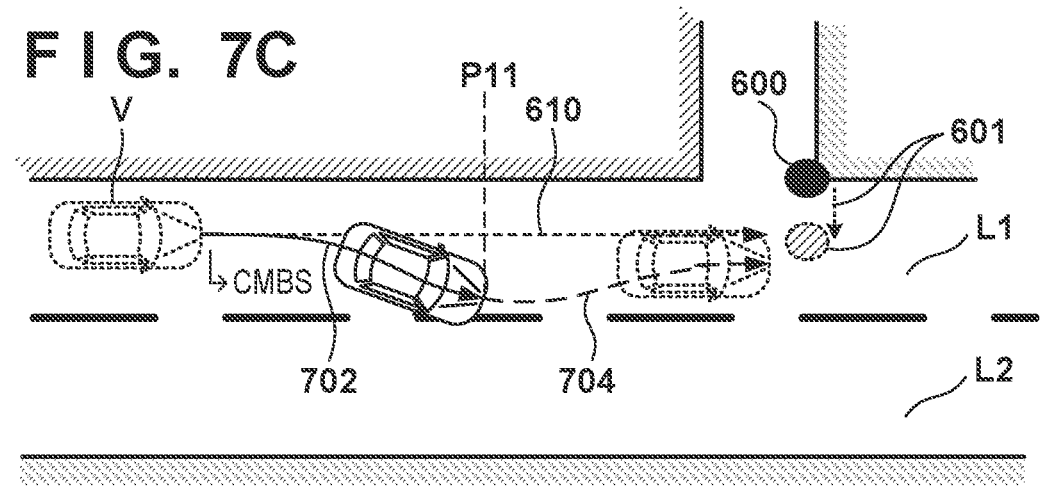

Next, the CMBS avoidance operation and steering assistance by the CMBS in S211 will be described. FIG. 3 is a flowchart illustrating the CMBS-based collision avoidance operation and steering assistance. FIGS. 7A to 7C are diagrams illustrating examples of the CMBS-based collision avoidance operation and steering assistance. The ECU 20 uses the trajectory 610 set by the calculation of the CMBS-based collision avoidance operation in S206 to perform a collision avoidance operation by braking control and steering assistance for keeping the vehicle V in the lane L1.

In S301, the ECU 20 detects a difference between the trajectory 610 set by the calculation of the CMBS-based collision avoidance operation (S206) and the trajectory on which the vehicle V is actually traveling (hereinafter "traveling trajectory"). For example, in FIG. 7A, the traveling trajectory 701 of the vehicle V is shifted rightward with respect to the set trajectory 610, and the ECU 20 detects the direction and magnitude (the amount of shift) of this difference. In S302, the ECU 20 determines whether the magnitude of the difference detected in S301 exceeds a predetermined threshold. If it is determined that the magnitude of the difference detected in S301 exceeds the predetermined threshold, the processing proceeds to S303. If it is determined that the magnitude of the difference detected in S301 is equal to or less than the predetermined threshold, the processing proceeds to S305.

In S303 and S304, the ECU 20 guides the driver to operate the steering wheel in a direction in which the calculated difference is eliminated. In the present embodiment, guidance by display (S303) and guidance by application of vibration to the steering wheel (S304) are performed. In S303, the ECU 20 makes, via the ECU 25, a notification for prompting the driver to operate the steering wheel in a direction in which the calculated difference is eliminated (display guidance). In the display guidance, the driver is instructed to operate the steering wheel by a notification indicating the steering direction (including a visual instruction and/or an auditory instruction), for example.

FIG. 7A illustrates an example in which a display indication 721 prompting a steering wheel operation to the left is provided because the traveling trajectory of the vehicle V is shifted rightward with respect to the trajectory 610. Positions P1 to P4 are aligned along the direction of the lane L1. Here, for simplicity of description, it is assumed that estimated positions on the trajectory 610 in the direction of the lane L1 at times t1 to t4 (t1<t2<t3<t4) and the positions on the traveling trajectory 701 of the vehicle V at times t1 to t4 in the direction of the lane L1 are positions P1 to P4. At position P1 (time t1), the difference between the trajectory 610 and the traveling trajectory 701 is small (less than a threshold), and thus the display guidance by the display indication 721 is not performed. At position P2 (time t2), the difference (the amount of deviation to the right) between the trajectory 610 and the traveling trajectory 701 is equal to or larger than the threshold, and the display guidance by the display indication 721 is performed. Note that the display form of the display guidance may be changed based on the amount of deviation between the trajectory 610 and the traveling trajectory 701 so that the driver can grasp the magnitude of the difference between the trajectory 610 and the traveling trajectory 701. For example, in FIG. 7A, the difference between the trajectory 610 and the traveling trajectory 701 increases as the vehicle V advances from position P3 (time t3) to position P4 (time t4), and the number of lights of the display indication 721 changes with the magnitude of the difference. Note that triangular lights in the display indication 721 may be sequentially turned on to guide the steering. For example, three triangular lights pointing leftward may be sequentially turned on to indicate the steering direction. In addition, in this case, the speed of sequentially turning on the triangles may be increased as the deviation between the trajectory 610 and the traveling trajectory 701 is larger.

In S304, the ECU 20 outputs a control command to the ECU 22 to vibrate the steering wheel ST (steering guidance) in order to prompt the driver to operate the steering wheel in the direction in which the calculated difference is eliminated. Note that, in the steering guidance in S304, the form of vibration may be changed according to the magnitude of the difference calculated in S301. For example, the magnitude of vibration may be increased or the number of vibrations may be increased as the difference is larger.

In S305, the ECU 20 determines whether at least a part of the vehicle V has crossed the lane L1 on which the vehicle V is currently traveling. For example, the ECU 20 monitors a lane division line (white line) of the lane detected by the ECU 21, and determines that the vehicle V has deviated from the lane L1 when a predetermined portion of the vehicle V goes over the division line (for example, when a right wheel crosses a right division line). When it is determined that at least a part of the vehicle V has crossed the lane L1 on which the vehicle V is currently traveling (YES in S305), in S306, the ECU 20 provides a control command to the ECU 22 to perform steering correction so that the entire vehicle V returns to the lane L1. In the steering correction, the ECU 20 provides a control command to the ECU 22, and the ECU 22 performs steering so that the vehicle V returns into the lane L1 with a predetermined steering force. The steering force applied by the ECU 22 here is controlled so that the steering drive torque becomes about 50 Nm or less so as to allow the driver to perform handover, for example.

FIG. 7B illustrates an example of the steering correction. The deviation of the vehicle V from the lane L1 is detected at position P11. While the vehicle V travels on a traveling trajectory 702 before position P11 (before the vehicle V deviates from the lane L1), the steering guidance described above is performed (S302 to S304). When it is detected at position P11 that the vehicle V has deviated from the lane L1, a trajectory 703 is set to return the traveling trajectory to the trajectory 610, and steering correction is performed accordingly (S306). FIG. 7C illustrates another example of the steering correction. In FIG. 7C, when it is detected at position P11 that the vehicle V has deviated from the lane L1, a trajectory 704 is set to return the traveling trajectory into the lane L1, and steering correction is performed accordingly. Since the steering correction is performed to return the vehicle V to the lane L1 with a smaller steering amount, the force applied to the driver or the vehicle V can be reduced.

Note that, in the above description, the steering correction is performed when the vehicle V deviates from the lane L1, but there is no limitation in this regard. For example, if it is determined in S305 that the difference between the traveling trajectory of the vehicle V and the trajectory 610 set as the CMBS-based collision avoidance operation exceeds a threshold (which is greater than the threshold used in S302), steering correction may be performed to eliminate the difference. In addition, in the above description, the steering correction is performed in response to the detection that the vehicle V has deviated from the lane L1 or the difference between the trajectories has exceeded the threshold in S305, but there is no limitation in this regard. For example, after it is detected that the vehicle V has deviated from the lane L1 (or the difference between the trajectories has exceeded the threshold), the steering correction may be started in response to the driver operating the steering wheel to return to the original lane. In addition, in the above description, an example has been shown in which two-stage steering assistance including steering guidance (S303 and S304) and steering correction (S306) is performed, but there is no limitation in this regard. For example, the steering correction may be performed when it is determined in S302 that the difference exceeds the threshold. At this time, steering guidance such as the display indication 721 may be performed in parallel. In addition, when the driver operates the steering wheel in a direction toward a wall or a sidewalk during the collision avoidance operation (in FIGS. 7A to 7C, when the driver operates the steering wheel to the right), the steering correction may be performed before the vehicle V deviates from the lane L1 in order to avoid collision with the wall or entry into the sidewalk. That is, the condition for starting the steering correction may be different between the case of steering rightward and the case of steering leftward.

In S307, the ECU 20 determines whether the vehicle V has stopped, and if the vehicle V has not stopped, returns the processing to S306. In this manner, the steering correction is performed until the vehicle V stops. If it is determined in S307 that the vehicle V has stopped, the processing ends.

On the other hand, if it is determined in S305 that the vehicle V has not deviated from the lane L1, the processing proceeds to S308. In S308, the ECU 20 determines whether the vehicle V has stopped. If it is determined in S308 that the vehicle V has stopped, the processing ends. If it is determined in S308 that the vehicle V has not stopped, the ECU 20 repeats the processing from S301. Note that, during the repetition of the processing in S301 to S308, the ECU 20 may recalculate the trajectory 610 based on the current position and movement prediction of the object 600, the current position and speed of the vehicle V, the angle of the steering wheel, and the like. In this case, as a trajectory for maintaining the vehicle V in the traveling lane, the trajectory may be changed so as to avoid abrupt steering correction. For example, if the trajectory 610 is updated by recalculation before reaching position P11 and a new trajectory is set on the right side relative to the position of the trajectory 610 shown in FIG. 7B (substantially the center of the lane L1), abrupt steering correction to return to the trajectory 610 at the center of the lane L1 can be avoided.

<AES-L-Based Collision Avoidance Operation>

Figure 8A:
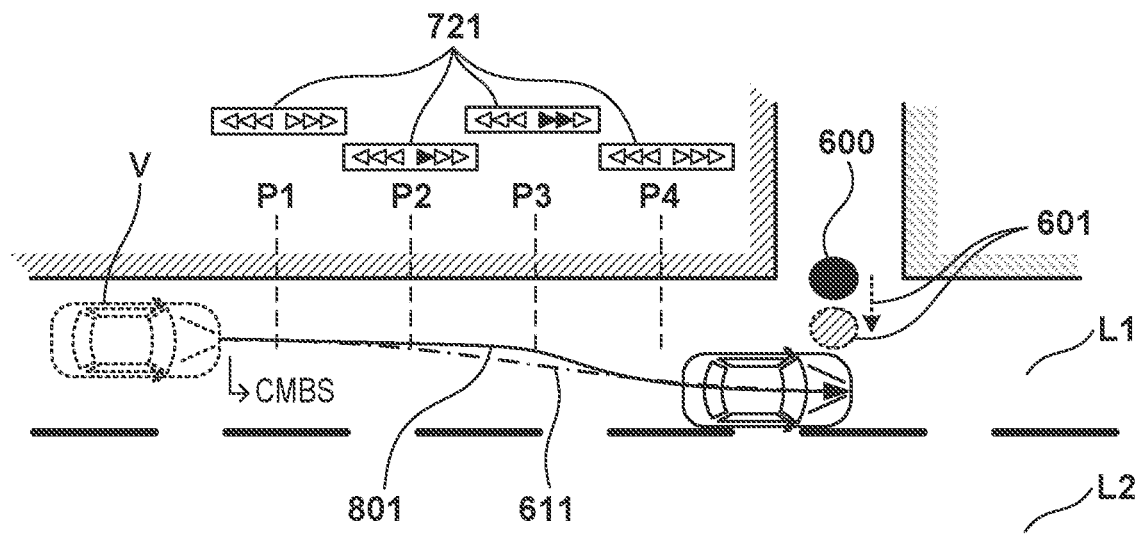
FIGS. 8A and 8B illustrate control examples of the AES-L-based collision avoidance operation and steering assistance.
Figure 8B:
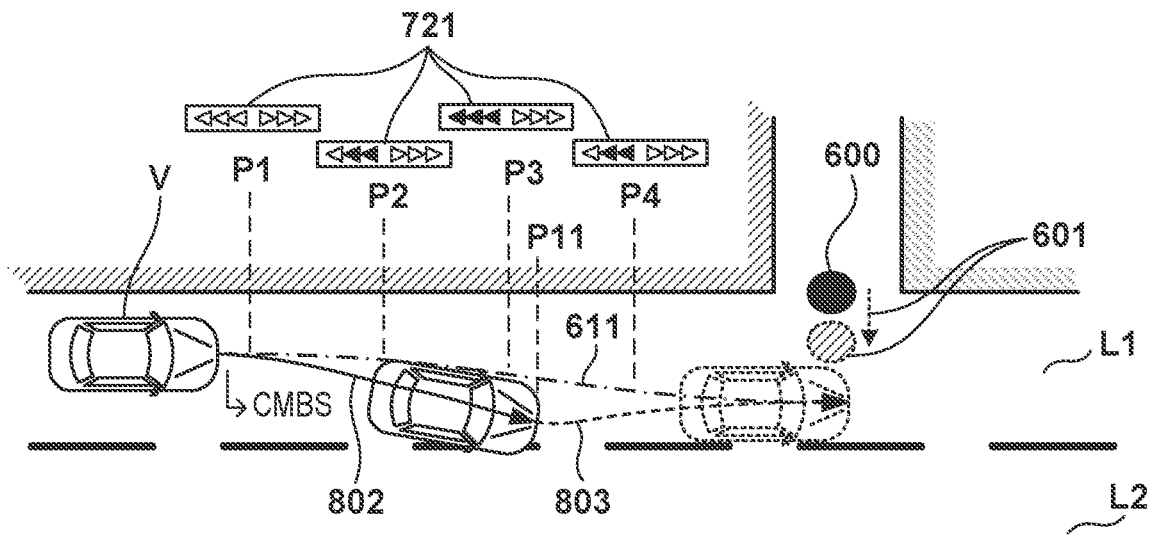

Next, the AES-L-based collision avoidance operation in S213 will be described. FIG. 4 is a flowchart illustrating the AES-L-based collision avoidance operation. FIGS. 8A and 8B are diagrams illustrating examples of the AES-L-based collision avoidance operation. The ECU 20 uses the trajectory 611 set by the calculation of the AES-L-based collision avoidance operation in S207 to perform collision avoidance by braking control and steering assistance.

In S401, the ECU 20 detects the difference (direction and magnitude) between the trajectory set by the calculation of the AES-L-based collision avoidance operation (S207) and the traveling trajectory on which the vehicle V is actually traveling. For example, in FIG. 8A, the traveling trajectory 801 of the vehicle V is shifted leftward with respect to the trajectory 611, and the ECU 20 detects the direction and magnitude (the amount of shift) of this difference. In S402, the ECU 20 determines whether the magnitude of the difference detected in S401 exceeds a predetermined threshold. If it is determined that the magnitude of the difference detected in S401 exceeds the predetermined threshold, the processing proceeds to S403. If it is determined that the magnitude of the difference detected in S401 is equal to or less than the predetermined threshold, the processing proceeds to S405.

In S403, the ECU 20 performs display guidance for causing the driver to operate the steering wheel in a direction in which the calculated difference is eliminated. The display guidance is as described above with respect to S303, and instructs the driver to operate the steering wheel by a display indication indicating the steering direction (including a visual instruction and/or an auditory instruction). For example, in FIG. 8A, since the traveling trajectory 801 of the vehicle V is shifted leftward with respect to the trajectory 611, the driver is instructed by the display indication 721 to operate the steering wheel to the right.

In S404, the ECU 20 performs steering correction by applying a predetermined steering force such that the traveling trajectory of the vehicle V coincides with the trajectory 611. The steering force applied by the ECU 22 in the steering correction is as described with respect to S306. FIG. 8A shows the case where the traveling trajectory 801 is shifted from the trajectory 611 due to a driver's steering wheel operation exceeding the steering force of the system, but steering correction is performed such that the traveling trajectory 801 returns to the trajectory 611.

In S405, the ECU 20 determines whether the vehicle V has stopped, and if it is determined that the vehicle V has not stopped, repeats the processing from S401. If it is determined in S405 that the vehicle V has stopped, the ECU 20 ends the processing.

Note that, although the display guidance and the steering correction are performed on the same condition in the steering assistance in the AES-L-based collision avoidance operation described with reference to FIG. 4, there is no limitation in this regard. For example, the trajectory 611 may be used to perform the collision avoidance operation and steering assistance shown in FIG. 3. That is, steering correction of returning the vehicle V to the trajectory 611 may be performed in response to at least a part of the vehicle V deviating from the lane L1. An example of this control is illustrated in FIG. 8B. Before position P11, the ECU 20 does not detect that the vehicle V deviates from the lane L1, and thus repeats the display guidance (S303) and the steering wheel guidance (S304). When detecting that the vehicle V has deviated from the lane L1 at position P11, the ECU 20 performs steering correction of applying a steering force such that the traveling trajectory 803 coincides with the trajectory 611 (S306). Note that, in the steering correction, the steering correction may be performed so as to return the traveling trajectory of the vehicle V to the trajectory 611, or the steering correction may be performed with a smaller steering amount such that the entire vehicle V is within the lane L1.

Note that, during the repetition of the processing of the collision avoidance operation, similar to the CMBS-based collision avoidance operation, the ECU 20 may recalculate the trajectory 611 based on the position and movement prediction of the object 600, the position and speed of the vehicle V, the angle of the steering wheel, and the like.

<AES-F-Based Collision Avoidance Operation>

Figure 5A:
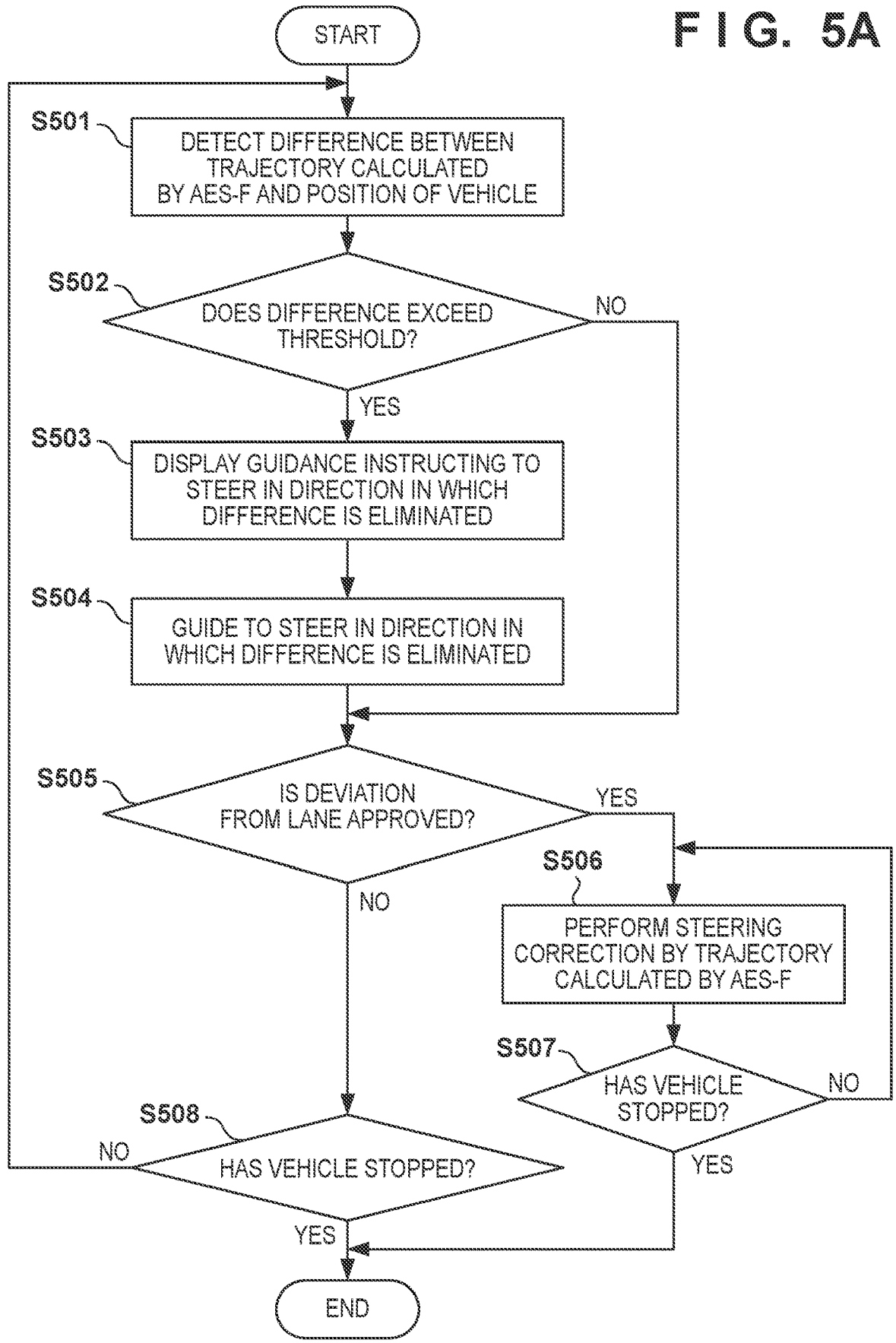
FIG. 5A is a flowchart illustrating control for a collision avoidance operation and steering assistance by emergency steering that allows deviation from a lane.
Figure 9A:
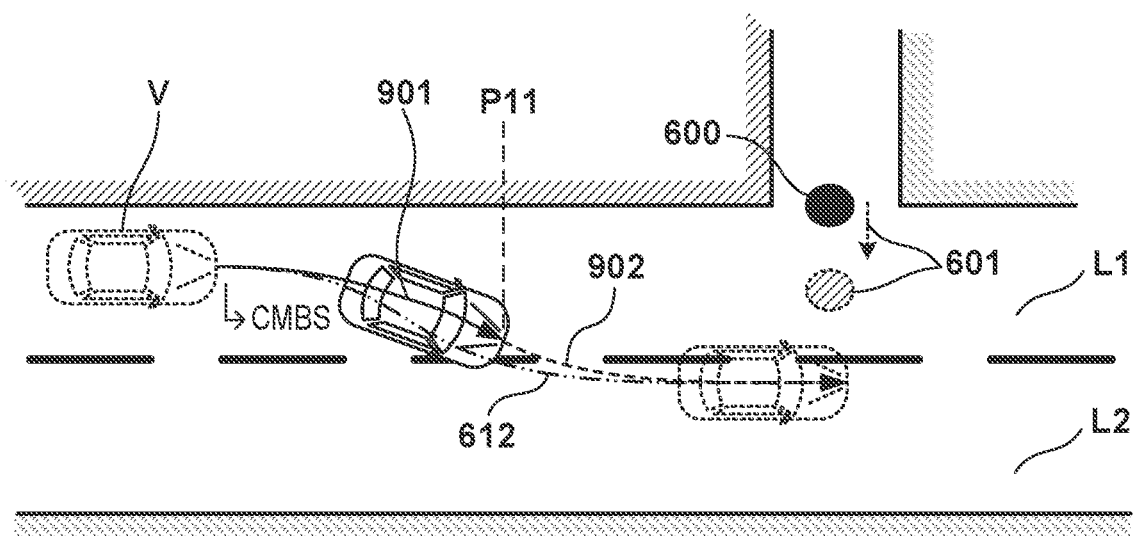
FIGS. 9A and 9B illustrate control examples of the AES-F-based collision avoidance operation and steering assistance.
Figure 9B:
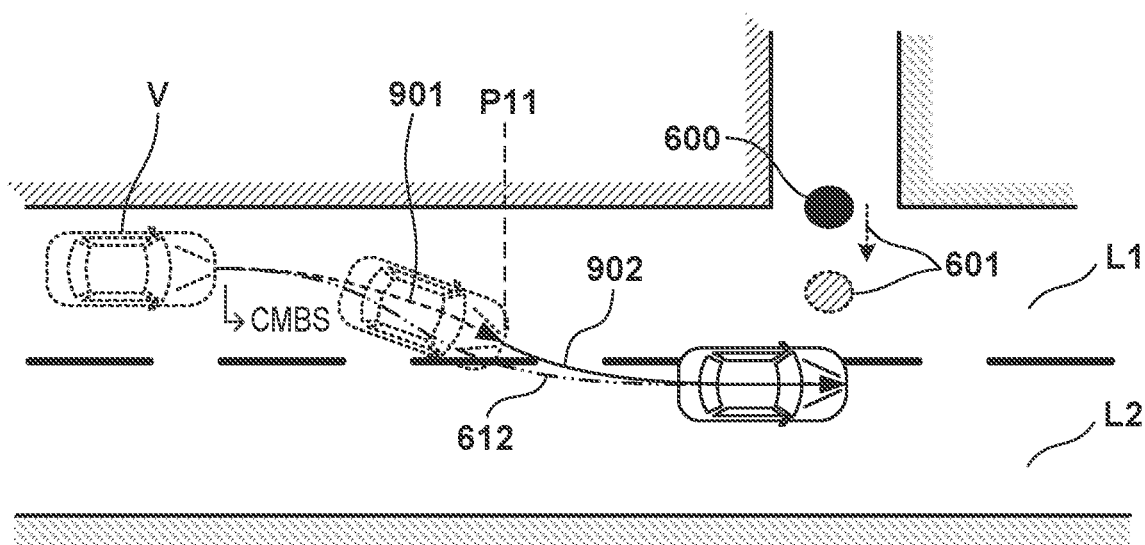

Next, the AES-F-based collision avoidance operation in S215 will be described. FIG. 5A is a flowchart illustrating the AES-F-based collision avoidance operation. FIGS. 9A and 9B are diagrams illustrating examples of the AES-F-based collision avoidance operation. The ECU 20 uses the trajectory 612 set by the calculation of the AES-F-based collision avoidance operation in S208 to perform collision avoidance by braking control and steering assistance.

In S501, the ECU 20 detects the difference (direction and magnitude) between the trajectory set by the calculation of the AES-F-based collision avoidance operation (S208) and the traveling trajectory on which the vehicle V is actually traveling. For example, in FIG. 9A, the traveling trajectory 901 of the vehicle V is shifted leftward with respect to the trajectory 612, and the ECU 20 detects the direction and magnitude (the amount of shift) of this difference. In S502, the ECU 20 determines whether the difference detected in S501 exceeds a predetermined threshold. If it is determined that the magnitude of the difference detected in S501 exceeds the predetermined threshold, the processing proceeds to S503. If it is determined that the magnitude of the difference detected in S501 is equal to or less than the predetermined threshold, the processing proceeds to S505.

In S503 and S504, the ECU 20 guides the steering in a direction in which the calculated difference is eliminated. The guidance in S503 and S504 is the same as the guidance performed in S303 and S304. That is, in S503, the ECU 20 provides a control instruction to the ECU 25 to perform display guidance for prompting the driver to operate the steering wheel in a direction in which the calculated difference is eliminated. In addition, in S504, the ECU 20 provides a control instruction to the ECU 22 to perform steering guidance by vibrating the steering wheel ST in order to instruct the driver to operate the steering wheel in the direction in which the difference calculated in S501 is eliminated.

In S505, the ECU 20 determines whether the deviation from the traveling lane L1 is approved by the driver. Upon this approval, the ECU 20 starts steering correction using the trajectory set in S208. For example, it is determined that the deviation from the traveling lane L1 is approved when at least a part of the vehicle V crosses the lane L1 due to a driver's operation on the steering wheel. If it is determined that the deviation from the traveling lane is approved (YES in S505), in S506, the ECU 20 performs steering correction such that the vehicle V travels along the trajectory 612. The steering correction is as described with respect to S306. In S507, it is determined whether the vehicle has stopped. If it is determined that the vehicle is not stopped, the processing returns to S506, and the steering correction using the trajectory 612 is continued. If it is determined in S507 that the vehicle V has stopped, the processing ends.

When it is detected that a part of the vehicle V deviates from the lane L1 at position P11 in FIG. 9B, the ECU 20 determines that the deviation from the lane L1 is approved by the driver (YES in S505). Then, the ECU 20 performs steering correction such that the traveling trajectory of the vehicle V coincides with the trajectory 612 for avoiding collision by deviating from the lane. As a result, the vehicle V travels on a traveling trajectory 902, for example. As described above, in the AES-F-based collision avoidance operation, the ECU 20 performs guidance based on the difference between the trajectory 612 and the traveling trajectory 901 before the approval of lane deviation (before position P11). After the approval of the lane deviation (after position P11), the ECU 20 performs steering correction by applying a steering force such that the traveling trajectory coincides with the trajectory 612.

On the other hand, if it is determined in S505 that the deviation from the lane is not approved, the processing proceeds to S508. In S508, the ECU 20 determines whether the vehicle V has stopped, and if it is determined that the vehicle V has not stopped, repeats the processing from S501. If it is determined in S508 that the vehicle V has stopped, the processing ends.

Figure 10A:
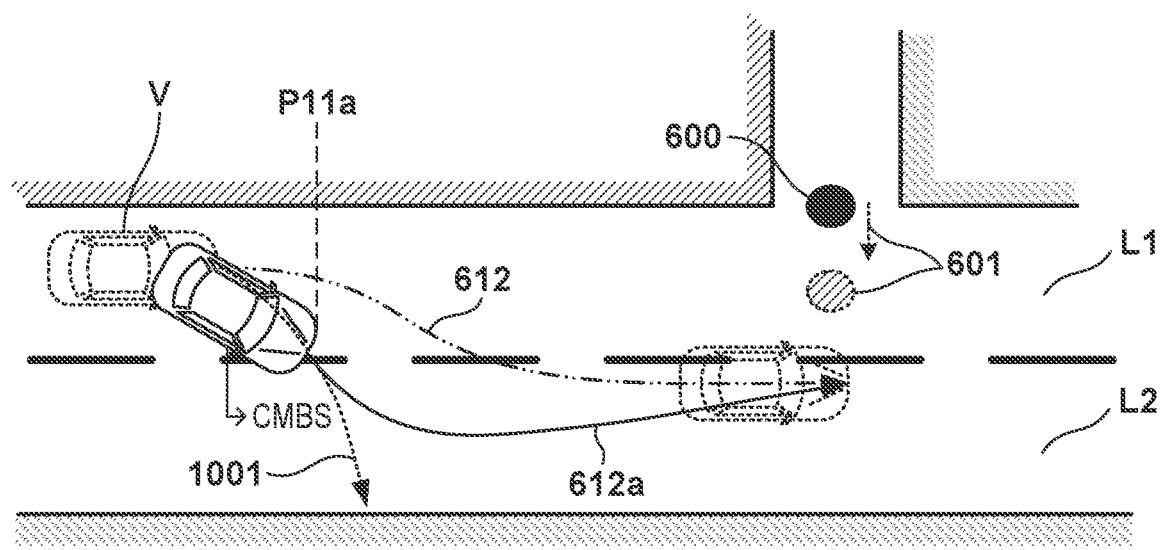
FIGS. 10A and 10B illustrate control examples of steering assistance in the case of a large steering amount in the AES-F-based collision avoidance operation.

Note that, during the repetition of the processing of the collision avoidance operation, similar to the CMBS- and AES-L-based collision avoidance operations described above, the ECU 20 may recalculate the trajectory 611 based on the position and movement prediction of the object 600, the position and speed of the vehicle V, the angle of the steering wheel, and the like. For example, as shown in FIG. 10A, if the position of vehicle V when it is determined that the deviation from the lane L1 is approved by the driver (YES in S505) is position P11a, the trajectory 612 is still inside the lane L1. In this case, it is not necessary to return the traveling trajectory of the vehicle V to the trajectory 612, and it is preferable to recalculate the trajectory of the vehicle V so as to gradually merge with the trajectory 612.

Figure 10B:
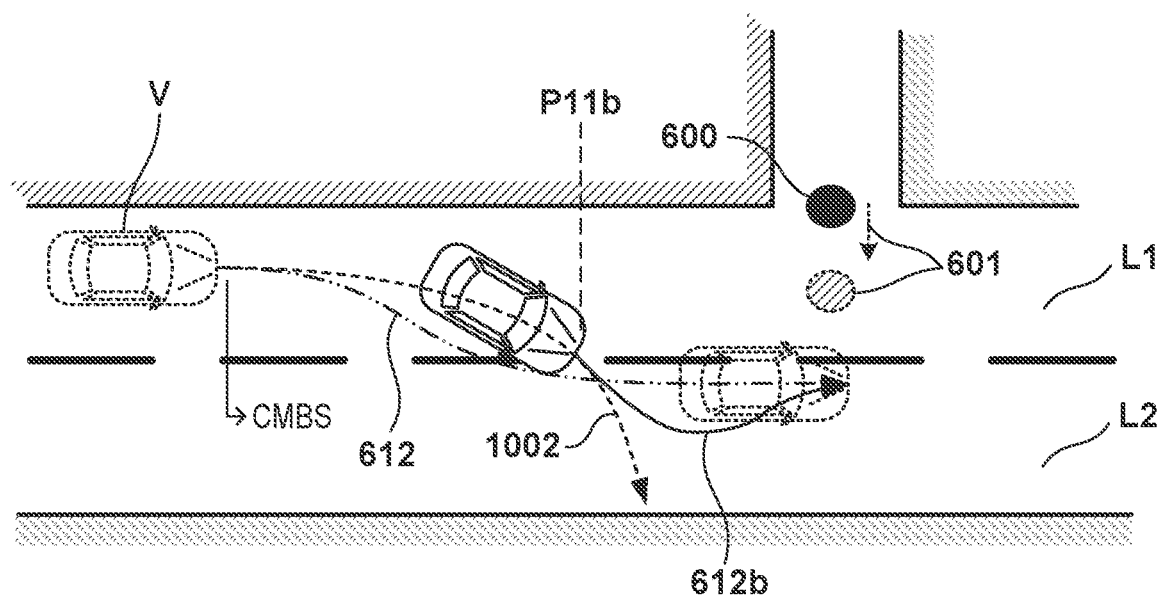

In addition, if the steering wheel of the vehicle V has been turned greatly toward the outside of the lane (for example, toward the lane L2) beyond the trajectory 612 (the steering wheel has been turned greatly at position P11a) when it is determined that the deviation from the lane L1 is approved by the driver (YES in S505), the vehicle V is expected to travel on a trajectory 1001. Alternatively, if the steering wheel has been turned greatly toward the lane L2 due to a delayed steering wheel operation as shown in FIG. 10B when it is determined that the answer is YES in S505, the vehicle V is expected to travel on a trajectory 1002. When the vehicle V travels along the trajectory 1001 or 1002, collision (secondary collision) with a side wall of the lane L2 or an object present in the adjacent lane L2 may occur.

Figure 5B:
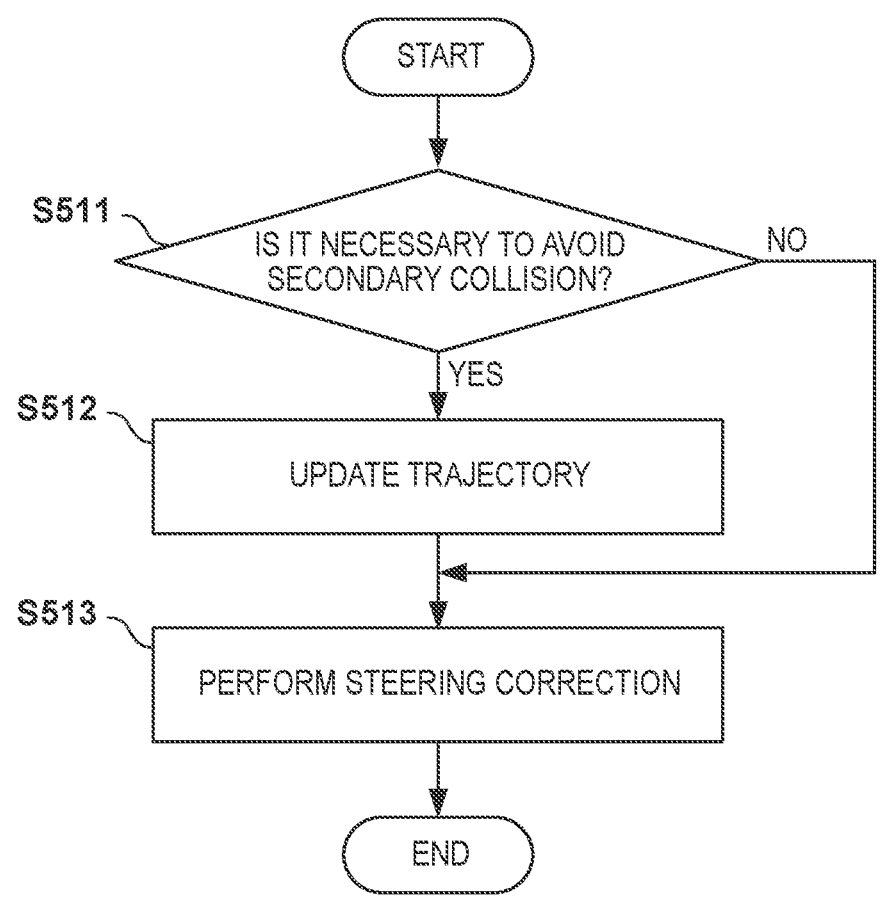
FIG. 5B is a flowchart illustrating control for steering correction in the emergency steering that allows deviation from the lane.

In order to reduce or prevent the occurrence of such secondary collision due to a sudden movement of the steering wheel, the processing shown in the flowchart of FIG. 5B may be performed in the steering correction control in S506. S511 to S513 are steps that replace S506. First, in S511, the ECU 20 determines whether it is necessary to avoid secondary collision. For example, the ECU 20 predicts the trajectory 1001 based on the speed of the vehicle V, the operation amount of the steering wheel, and the CMBS-based braking control. Then, when the angle θ formed by the tangential direction of the calculated trajectory 612 at position P11a and the tangential direction of the predicted trajectory 1001 at position P11a exceeds a predetermined value, the ECU 20 determines that avoidance of the secondary collision is necessary. When it is determined that avoidance of the secondary collision is necessary (YES in S511), the processing proceeds to S512. In S512, the ECU 20 calculates a new trajectory 612a so as to avoid the secondary collision and merge with the trajectory 612. At this time, it is preferable to calculate a trajectory that merges with the trajectory 612 with as smooth steering as possible. In S513, the ECU 20 performs steering correction based on the trajectory recalculated in S512.

The same applies to the case where a steering wheel operation is performed as shown in FIG. 10B. The ECU 20 determines that it is necessary to avoid the secondary collision since the angle θ formed by the tangential direction of the trajectory 612 at position P11b and the tangential direction of the predicted trajectory 1001 exceeds a predetermined value. Then, in S512, the ECU 20 calculates a new trajectory 612*b* so as to avoid the secondary collision and merge with the trajectory 612. As a result of the above processing, secondary collision due to excessive steering performed during the display guidance and the steering guidance (during the repetition of S503 and S504) can be effectively avoided. In both the examples of FIGS. 10A and 10B, steering correction is performed in a direction opposite to the driver's steering direction.

Note that steering correction may be performed so as to immediately merge with the trajectory 612 when sudden steering that causes a great deviation from the trajectory calculated by the AES-F is detected, even before the deviation from the lane L1 is approved by the driver (before it is determined in S505 that the answer is YES). In this manner, it is possible to quickly perform steering correction in response to sudden steering occurring in the lane L1 and to more reliably avoid the secondary collision.

In the above embodiment, the AES-L-based collision avoidance operation and the AES-F-based collision avoidance operation are calculated separately, but there is no limitation in this regard. For example, an avoidance trajectory may be calculated so as to reduce the steering amount as much as possible (for example, to minimize the steering amount), and it may be determined whether the obtained avoidance trajectory is a trajectory that keeps the vehicle V in the lane (S212) or a trajectory that deviates from the lane (S214). In addition, when it is determined that collision can be avoided by the CMBS based on the calculation of the CMBS-based collision avoidance operation, the calculation of the AES-L-based collision avoidance operation and the AES-F-based collision avoidance operation may be omitted.

Summary of Embodiment

The above embodiment discloses at least the following embodiments.
1. A vehicle control device (for example, 1) according to the above embodiments, which controls steering and braking of a vehicle, comprises:
    a first determination unit (for example, ECU 20, S201-S205) configured to determine, based on prediction of movement of an object detected on a road and prediction of a traveling trajectory of the vehicle, whether collision between the vehicle and the object will occur;
    a second determination unit (for example, ECU 20, S206-S210) configured to determine whether it is possible to avoid the collision by braking without steering when it is determined by the first determination unit that the collision will occur; and
    an assistance unit (for example, ECU 20, ECU 22, S211) configured to perform braking control for avoiding the collision and assist the steering such that the vehicle remains in a lane in which the vehicle is traveling when it is determined by the second determination unit that it is possible to avoid the collision by braking.
According to this embodiment, it is possible to more reliably avoid a hazard that may occur due to an unnecessary steering wheel operation by the driver in a situation where collision can be avoided by braking control such as by the CMBS.
2. In the above embodiments, the vehicle control device further comprises a setting unit (for example, S206) configured to set a trajectory on which the vehicle remains in the lane in which the vehicle is traveling during collision avoidance by the braking control, wherein
    the assistance unit assists the steering of the vehicle based on the trajectory (for example, S213, S301-S306).
According to this embodiment, it is possible to guide the driver such that the traveling trajectory of the vehicle maintains a safe trajectory during the collision avoidance by braking control, improving safety.
3. In the above embodiments, the assistance unit guides a driver by a visual or auditory instruction to steer the vehicle in a direction in which a difference between an actual trajectory of the vehicle and the trajectory set by the setting unit is eliminated (for example, S303).
According to this embodiment, the visual/auditory guidance for the driver is performed such that the traveling trajectory of the vehicle maintains a safe trajectory during the collision avoidance by braking control.
4. In the above embodiments, the assistance unit provides the instruction in different forms based on a magnitude of the difference (for example, S303, FIG. 7A).
According to this embodiment, it is possible to intuitively grasp the amount of deviation of the traveling trajectory of the vehicle from a planned trajectory during the collision avoidance by braking control, realizing more effective steering assistance.
5. In the above embodiments, the assistance unit causes a steering wheel to vibrate in order to guide a driver to steer the vehicle in a direction in which a difference between an actual trajectory of the vehicle and the trajectory set by the setting unit is eliminated (for example, S304).
According to this embodiment, guidance is performed by vibration of the steering wheel such that the traveling trajectory of the vehicle maintains a safe trajectory during the collision avoidance by braking control, and thus the driver can be directly guided.
6. In the above embodiments, the assistance unit changes a magnitude of the vibration based on a magnitude of the difference.
According to this embodiment, it is possible to intuitively grasp the amount of deviation of the traveling trajectory of the vehicle from a planned trajectory during the collision avoidance by braking control, realizing more effective steering assistance.
7. In the above embodiments, the vehicle control device further comprises a detection unit (for example, S305) configured to detect that at least a part of the vehicle deviates from a lane in which the vehicle is traveling, wherein
    when it is detected by the detection unit that at least a part of the vehicle deviates from a lane in which the vehicle is traveling, the assistance unit applies a steering force to return the vehicle to the lane (for example, S306, FIGS. 7B and 7C).
According to the above embodiment, when a steering wheel operation is performed such that the vehicle goes out of the lane during the collision avoidance braking control, a steering force that returns the vehicle into the lane is applied. This allows the vehicle to return into the lane and travel on a safer trajectory.
8. In the above embodiments, the vehicle control device further comprises a detection unit (for example, S305) configured to detect that at least a part of the vehicle deviates from a lane in which the vehicle is traveling, wherein when it is detected by the detection unit that at least a part of the vehicle deviates from a lane in which the vehicle is traveling, the assistance unit applies a steering force to return the traveling trajectory of the vehicle to the trajectory set by the setting unit (for example, S306, FIG. 7B).

According to the above embodiment, when a steering wheel operation is performed such that the vehicle goes out of the lane during the collision avoidance by braking control, a steering force that returns the vehicle into the lane is applied, so that the vehicle can return into the lane and travel on a safer trajectory.

9. In the above embodiments, after it is detected by the detection unit that at least a part of the vehicle deviates from a lane in which the vehicle is traveling, when a steering wheel operation is performed by a driver to return to the lane, the assistance unit applies a steering force to return the traveling trajectory of the vehicle to the trajectory set by the setting unit.

According to this configuration, it is possible to perform steering correction reflecting the intention of the driver to return the steering wheel.

10. In the above embodiments, the vehicle control device further comprises a calculation unit (for example, S207, S208) configured to calculate an avoidance trajectory for allowing the vehicle to deviate from the lane to avoid the collision between the vehicle and the object, wherein
the assistance unit assists the steering of the vehicle using the avoidance trajectory when it is impossible to avoid the collision only by the braking control (for example, S213, S215).

According to the above embodiment, when collision cannot be avoided only by braking control, steering assistance is performed along an avoidance trajectory for performing steering to avoid the collision. Therefore, even when collision cannot be avoided only by braking control, the driver can be provided with steering assistance such that the vehicle travels on a safer trajectory.

11. In the above embodiments, when the avoidance trajectory indicates a trajectory on which the vehicle deviates from the lane, the assistance unit applies a steering force such that the traveling trajectory of the vehicle coincides with the avoidance trajectory in response to deviation of a predetermined portion of the vehicle from the lane due to a steering wheel operation by a driver (for example, S505, S506).

According to the above embodiment, when an avoidance trajectory on which the vehicle goes out of the lane is set, a steering force for causing the vehicle to travel on the avoidance trajectory is applied in response to a driver's steering wheel operation that causes the vehicle to go out of the lane. Even when an avoidance trajectory on which the vehicle goes out of the lane is set, it is possible to check whether the driver allows the deviation of the vehicle from the lane.

12. Also, in the above embodiments, vehicle control method for controlling steering and braking of a vehicle is disclosed, wherein the method comprises:
determining (for example, S201-S205), based on prediction of movement of an object detected on a road and prediction of a traveling trajectory of the vehicle, whether collision between the vehicle and the object will occur;
determining (for example, S206-S210) whether it is possible to avoid the collision by braking without steering when it is determined that the collision will occur; and
performing (for example, S211) braking control for avoiding the collision and assisting the steering such that the vehicle remains in a lane in which the vehicle is traveling when it is determined that it is possible to avoid the collision by braking.

According to this embodiment, it is possible to more reliably avoid a hazard that may occur due to an unnecessary steering wheel operation by the driver in a situation where collision can be avoided by braking control such as by the CMBS.

13. Further, in the above embodiments, a program for causing a computer to execute the vehicle control method and a storage medium containing the program are disclosed.

According to this embodiment, an ECU included in the vehicle control device executes the program, so that it is possible to more reliably avoid a risk that may occur due to an unnecessary steering wheel operation by the driver in a situation where collision can be avoided by braking control such as by the CMBS.

The invention is not limited to the foregoing embodiments, and various variations/changes are possible within the spirit of the invention.

What is claimed is:

1. A vehicle control device for controlling steering and braking of a vehicle, the vehicle control device comprising:
a first determination unit configured to determine, based on prediction of movement of an object detected on a road and prediction of a traveling trajectory of the vehicle, whether a collision between the vehicle and the object will occur;
a second determination unit configured to determine whether it is possible to avoid the collision by braking without steering when it is determined by the first determination unit that the collision will occur; and
an assistance unit configured to perform braking control for avoiding the collision and assist the steering such that the vehicle remains in a lane in which the vehicle is traveling, the assistance unit being further configured to perform only braking control for avoiding the collision when
the vehicle is steered by a driver of the vehicle towards the outside of the lane and
it is determined by the second determination unit that it is possible to avoid the collision by braking without automatic steering.

2. The vehicle control device according to claim 1, further comprising a setting unit configured to set a trajectory on which the vehicle remains in the lane in which the vehicle is traveling during collision avoidance by the braking control, wherein
the assistance unit assists the steering of the vehicle based on the trajectory.

3. The vehicle control device according to claim 2, wherein the assistance unit guides a driver by a visual or auditory instruction to steer the vehicle in a direction in which a difference between an actual trajectory of the vehicle and the trajectory set by the setting unit is reduced.

4. The vehicle control device according to claim 3, wherein the assistance unit provides the instruction in different forms based on a magnitude of the difference between the actual trajectory and the trajectory set by the setting unit.

5. The vehicle control device according to claim 2, wherein the assistance unit causes a steering wheel to vibrate in order to guide a driver to steer the vehicle in a direction in which a difference between an actual trajectory of the vehicle and the trajectory set by the setting unit is reduced.

6. The vehicle control device according to claim 5, wherein the assistance unit changes a magnitude of the vibration based on a magnitude of the difference between the actual trajectory and the trajectory set by the setting unit.

7. The vehicle control device according to claim 1, further comprising a detection unit configured to detect that at least a part of the vehicle deviates from the lane in which the vehicle is traveling, wherein
when it is detected by the detection unit that at least a part of the vehicle deviates from the lane in which the vehicle is traveling, the assistance unit applies a steering force to return the vehicle to the lane.

8. The vehicle control device according to claim 2, further comprising a detection unit configured to detect that at least a part of the vehicle deviates from the lane in which the vehicle is traveling, wherein
when it is detected by the detection unit that at least a part of the vehicle deviates from the lane in which the vehicle is traveling, the assistance unit applies a steering force to return the traveling trajectory of the vehicle to the trajectory set by the setting unit.

9. The vehicle control device according to claim 8, wherein after it is detected by the detection unit that at least a part of the vehicle deviates from the lane in which the vehicle is traveling, when a steering wheel operation is performed by a driver to return to the lane, the assistance unit applies a steering force to return the traveling trajectory of the vehicle to the trajectory set by the setting unit.

10. The vehicle control device according to claim 1, further comprising a calculation unit configured to calculate an avoidance trajectory for allowing the vehicle to deviate from the lane to avoid the collision between the vehicle and the object, wherein
the assistance unit assists the steering of the vehicle using the avoidance trajectory when the vehicle is estimated it cannot avoid the collision only by the braking control.

11. The vehicle control device according to claim 10, wherein when the avoidance trajectory indicates a trajectory on which the vehicle deviates from the lane, the assistance unit applies a steering force such that the traveling trajectory of the vehicle coincides with the avoidance trajectory in response to deviation of a predetermined portion of the vehicle from the lane due to a steering wheel operation by a driver.

12. A vehicle control method for controlling steering and braking of a vehicle, the method comprising:
determining, based on prediction of movement of an object detected on a road and prediction of a traveling trajectory of the vehicle, whether collision between the vehicle and the object will occur;
determining whether it is possible to avoid the collision by braking without steering when it is determined that the collision will occur; and
performing braking control for avoiding the collision and assisting the steering such that the vehicle remains in a lane in which the vehicle is traveling, and performing only braking control for avoiding the collision when
the vehicle is steered by a driver of the vehicle towards the outside of the lane and
it is determined that it is possible to avoid the collision by braking without automatic steering.

13. A non-transitory computer-readable storage medium having stored thereon a program that causes a computer to execute a vehicle control method for controlling steering and braking of a vehicle, the method comprising:
determining, based on prediction of movement of an object detected on a road and prediction of a traveling trajectory of the vehicle, whether collision between the vehicle and the object will occur;
determining whether it is possible to avoid the collision by braking without steering when it is determined that the collision will occur; and
performing braking control for avoiding the collision and assisting the steering such that the vehicle remains in a lane in which the vehicle is traveling, and performing only braking control for avoiding the collision when
the vehicle is steered by a driver of the vehicle towards the outside of the lane and
it is determined that it is possible to avoid the collision by braking without automatic steering.

* * * * *